United States Patent

Johnston

[15] 3,636,254

[45] Jan. 18, 1972

[54] DUAL-IMAGE REGISTRATION SYSTEM

[72] Inventor: Howard Ronald Johnston, Lexington, Mass.

[73] Assignee: Itek Corporation, Lexington, Mass.

[22] Filed: Nov. 12, 1969

[21] Appl. No.: 875,888

[52] U.S. Cl. ....................178/6.8, 250/220 SP, 356/2, 356/167, 356/203

[51] Int. Cl. ....................H04n 7/18, H01j 39/12

[58] Field of Search ....................356/2, 167, 203, 206; 250/220 SP; 178/6.5, 6.8

[56] References Cited

UNITED STATES PATENTS 3,432,674 3/1969 Hobrough....................356/2

*Primary Examiner*—Robert L. Griffin
*Assistant Examiner*—Joseph A. Orsino, Jr.
*Attorney*—Homer O. Blair and Robert L. Nathans

[57] ABSTRACT

Many dual-image registration systems employ a cross-correlation signal to control various system parameters. The amplitude of the signal is proportional to the level of correlatable image detail being simultaneously scanned in the two images. Described here is a technique for normalizing the cross-correlation signal by subtracting therefrom a normalizing signal with an amplitude responsive to the total level of detectable image detail being scanned. The resultant normalized signal has an amplitude that accurately represents the degree of image detail registration existing in the scanned images.

22 Claims, 3 Drawing Figures

Inventor:
H. Ronald Johnston,
by John E. Toupal Attorney

Inventor:
H. Ronald Johnston,
by John E. Toupal Attorney

Inventor:
H. Ronald Johnston,
by John E. Toupal
Attorney

DUAL-IMAGE REGISTRATION SYSTEM

BACKGROUND OF THE INVENTION

This invention relates generally to a dual-image registration system and, more particularly, relates to an automatically controlled image registration system.

Although not so limited, the present invention is particularly well suited for use with image registration systems employed during the production of topographic maps. Typically, maps of this type are obtained from stereoscopically related photographs taken from airplanes. When the photographs are accurately positioned in locations corresponding to the relative positions in which they were taken, their projection upon a suitable base can produce for an observer a three-dimensional presentation of the particular terrain imaged on the photographs. Also, according to well-known techniques, data indicating the relative elevations of specific points in the aligned images can be obtained.

The stereo photographs, however, generally do not possess images of exactly corresponding surface areas. For this reason, a coherent stereo presentation is obtained only if the photographs are properly registered, i.e., so positioned that homologous areas in the two projections are aligned and have the same orientation. The problem of image registration is accentuated by the fact that image detail in the photographs typically is not identical in all respects. Such detail nonuniformity is caused, for example, by photographing a scene from different camera viewpoints in the photographic aircraft. The resultant distortion between corresponding areas in the photographs prevents common detail registration when the images retained by both photographs a projected onto a common viewing plane.

A number of systems have been developed for simplifying the registration of dual images. Basically, most such registration systems scan homologous areas in the two images and convert the scanned graphic data into a pair of electrical video signals. By various correlation and analyzation techniques, the video signals are used to produce error signals representing certain types of distortion existing between the scanned images. The scanned areas are then rendered congruent by a transformation mechanism that induces appropriate relative movement and scanning pattern shape adjustment therebetween in response to the derived error signals.

In a typical stereo plotting instrument the similar images retained thereon are analyzed with respect to *x*- and *y*-coordinate axes. Relative image displacement along the axis corresponding to the direction of separation between the positions from which the stereo photographs were taken, commonly called *x*-parallax is corrected, for example, by a servomechanism that produces appropriate relative movement between the stereo plates or by height adjustment of a viewing surface which intercepts a projection of the images. The magnitude of required *x*-parallax correction is directly related to relative elevation of the terrain photographed and provides the contour information necessary for topographic maps. Scale distortion along the other coordinate axis, commonly known as *y*-parallax, and other first and higher order distortion also are corrected in systems providing a visual presentation of the stereo model. These latter types of distortion are corrected, for example, by producing relative changes in the rasters of the scanning devices utilized, by controlling optical devices used for projection of the images, or introducing appropriate relative movement between the stereographic plates. The entire stereo model represented by a single pair of stereographic plates is normally examined by traversing scanning patterns back and forth across the photographs along paths corresponding to the *y*-coordinate direction and incrementally spaced apart in the *x*-coordinate direction. Typical stereo plotting instruments of this type are disclosed, for example, in U.S. Pat. No. 2,964,644 issued on Dec. 13, 1960 to Gilbert Louis Hobrough, No. 3,145,303 issued on Aug. 18, 1964, to the same inventor, and No. 3,432,674 issued on Mar. 11, 1969 also to the same inventor.

An important problem associated with stereo plotters results from variations in the level of correlation quality experienced during a plotting operation. All aerial photographs have a structure and spatial frequency content that differs from point to point. For this reason the level of information available for correlation is continually varying as the plates are traversed. Various parameters of the correlation process must be correspondingly varied, therefore, if optimum results are to be obtained. For example, although registration accuracy is enhanced by reducing the size of the scanning rasters utilized, the acceptable minimum raster size is determined by correlation quality which is variably dependent upon correlatable image content. Thus, a larger raster size is desired during periods of poor correlation caused either by relative photo displacement or by dissimilar image detail information produced in photographs of rough terrain. An increase in raster size also is desired when scanning photographic images retaining a low level of variable image detail. Similarly, although rapid traversals of the stereo models are desirable in the interest of reduced processing time, the traversal velocity should be reduced during periods requiring large *x*-parallax correction so as to accommodate the inherent reaction time of the servomechanism producing that correction. It is desirable also to reduce traversing velocity when scanning areas of low information content because the correspondingly low values of the resultant error signals limit the rate at which servo corrections can be made.

Another system parameter that is undesirably subject to the type of image detail being scanned is the gain of the servosystem used for controlling *x*-parallax correction. To simplify servosystem design, it is desirable that electrical circuit gain be maintained substantially constant. However, gain, which is dependent upon the slope of the raw error signal derived from the video signals, is affected by both the size of the scanning patterns utilized and the level of inherent image detail in the scanned areas.

Previous systems such as those disclosed in the above noted patents have employed a cross-correlation signal indicative of correlation quality to control certain system parameters such as scanning pattern size and model traversing velocity. Also known and disclosed in U.S. Pat. application Ser. No. 839,940 of John W. Hardy et al., entitled MULTIPLE IMAGE REGISTRATION SYSTEM filed July 8, 1967 is the use of hold-fail circuits that incapacitate the image transformation systems so as to maintain status quo when correlation quality falls below a given predetermined value. Operation of the hold-fail circuitry is determined by the relative levels of a cross-correlation signal and a fixed reference voltage. During operational periods in which the cross-correlation signals exceed the reference voltage level the hold-fail circuits remain inactivated. However, if the cross-correlation signal drops below the reference level the hold circuits are activated and if the signal remains below the reference level for a predetermined length of time, the system goes into conditional failure.

All such previous registrations systems suffer from a basic limitation that restricts performance by, for example, causing undesirable system failure in areas of weak image detail, tending to lock the system onto strong detail imagery with similar structure in noncongruent areas or inducing system response to erroneous correlation quality input data. This basic limitation stems from an inability of the system to distinguish between low level cross-correlation signals produced by weak congruent image detail and low level cross-correlation signals produced by fortuitous similarity of noncongruent relatively strong image detail. The problem is particularly troublesome, with regard to the above noted hold-fail control circuits, since a high reference level setting increases the frequency of unnecessary system failures while a low setting increases the input of false data.

The object of this invention, therefore, is to provide an improved multiple image registration instrument that alleviates the problems presented above.

CHARACTERIZATION OF THE INVENTION

The invention is characterized by the provision of a multiple image registration system comprising electronic scanners for directing scanning patterns onto corresponding areas in a pair of similar images and a signal generator for producing first and second video analog signals representing variable detail along the paths scanned. The video analog signals are correlated to produce an orthogonal correlation signal having an amplitude proportional to the degree of relative image detail misregistration along the scanned paths and a cross-correlation signal having an amplitude proportional to the level of correlatable image detail along the scanned paths. Also produced by combining and rectifying the two video analog signals is a normalizing signal with an amplitude responsive to the total level of detectable image detail along the scanned paths. Subtraction of the normalizing signal from the cross-correlation signal results in a normalized cross-correlation signal with an amplitude that accurately represents the degree of image detail registration existing between the scanned paths. This normalized cross-correlation signal, therefore, can be used to accurately control a variety of system operating parameters including, for example, hold-fail circuit functions in the image transformation network, size of scanning patterns used, profiling velocity and gain of servo loops used to correct parallax.

According to a featured embodiment of the invention, scanning patterns composed of scanning lines oriented in orthogonally related *x* and *y* directions are employed and the cross-correlation signal is separated into an *x*-cross-correlation component derived during periods of scan and the *x*-direction and a *y*-cross-correlation component derived during periods of scan in the *y*-direction. Subtraction of the normalizing signal from each of the cross-correlation components results in a normalized *x*-cross-correlation signal and a normalized *y*-cross-correlation signal that are individually employed to effect control functions to which they are uniquely related.

DESCRIPTION OF THE DRAWINGS

These and other objects and features of the invention will become more apparent upon a perusal of the following specification taken in conjunction with the accompanying drawings wherein.

DESCRIPTION OF THE PREFERRED EMBODIMENT

Figure 1:
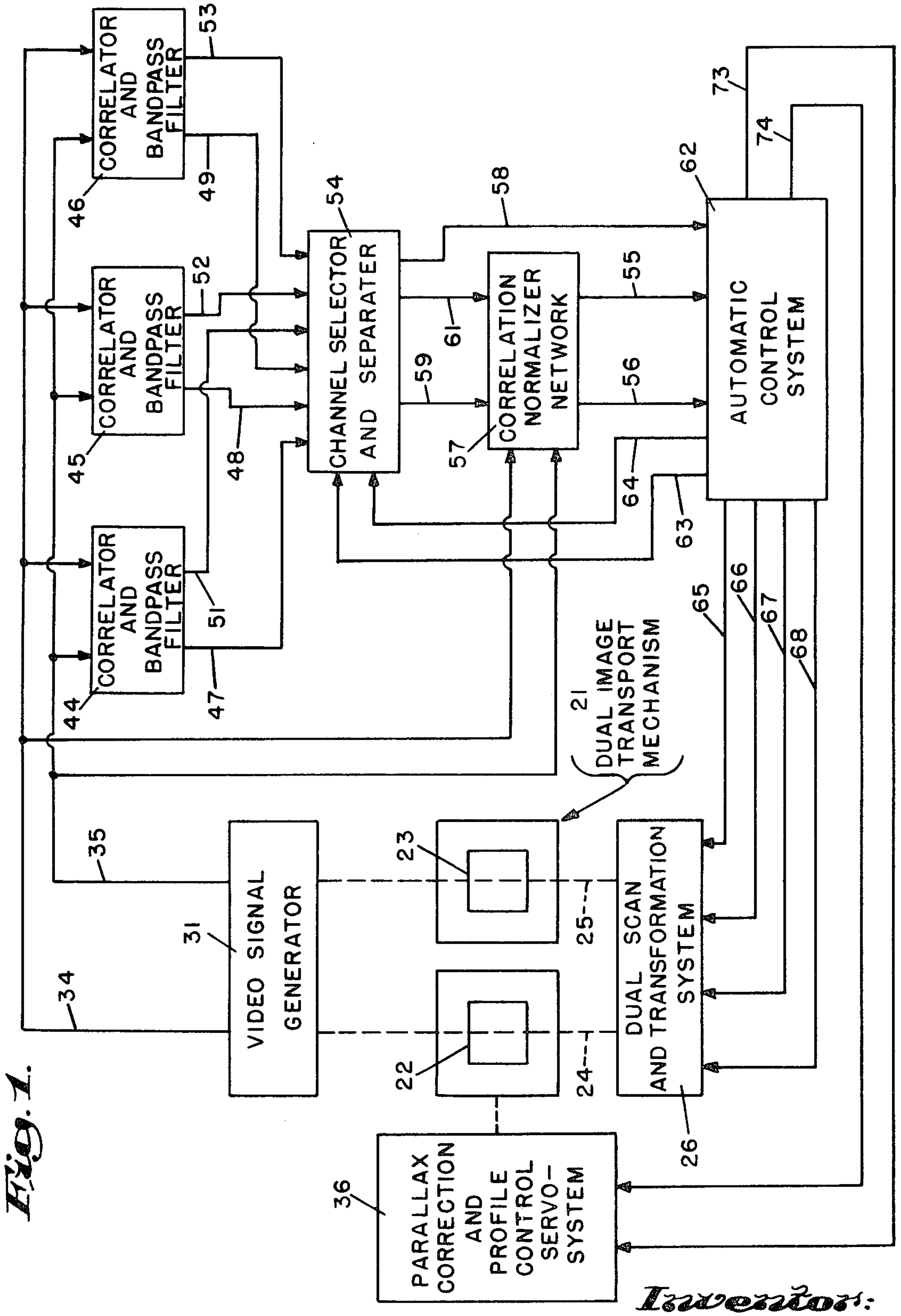
FIG. 1 is a general block diagram illustrating the functional relationship of the main components of the apparatus.

Referring now to FIG. 1 there is shown in block diagram form a dual image transport mechanism 21 retaining a pair of stereo photographic transparencies 22 and 23. Scanning beams 24 and 25 are directed through the transparencies 22 and 23 by a dual scan and transformation system 26. After passing through the transparencies 22 and 23 the scanning beams 24 and 25 are received by a video signal generator 31 that produces on lines 34 and 35, respectively, video analog signals representing the variable detail retained by the photographs. A parallax correction and profile control system 36 is mechanically coupled to the transport mechanism 21 and includes servomotors (not shown) for producing movement of the photographs 22 and 23. Parallax corrections are effected by introducing appropriate relative movement between the photographs 22 and 23 while stereo-model profiling is accomplished by introducing simultaneous movement of both photographs 22 and 23 relative to the scanning beams 24 and 25. The transport mechanism 21, the dual scan and transformation system 26, the video signal generator 31 and the parallax correction and profile control servosystem 36 are conventional and of the general type shown and described in above noted U.S. Pat. Nos. 2,964,644; 3,145,303 and 3,432,674.

Both of the analog signals on lines 34 and 35 are fed into each of three correlator and band-pass filter circuits 44, 45 and 46 that separate the signals into bands A, B and C. The circuits 44, 45 and 46 also correlate the video signals producing on lines 47, 48 and 49, cross-correlation signals proportional to the level of correlatable image detail being scanned in the photographs 22 and 23 and produce on lines 51, 52 and 53, orthogonal correlation signals proportional to the degree of relative image detail misregistration existing between the scanned paths. The correlator and band-pass filters 44, 45 and 46 also are conventional and do not, per se, form a part of this invention. Suitable circuits of this type are disclosed, for example, in the above noted U.S. patents.

The correlation signals on lines 47–53 are fed into a channel selector and separator network 54. The network 54 separates a cross-correlation signal selected from one of the lines 47, 48 and 49 into *y*- and *x*-cross-correlation components derived, respectively, during periods of orthogonally related *y*- and *x*-direction scans in the photographs 22 and 23. These components are fed on lines 59 and 61, respectively, into a correlation normalizer network 57. Also received by the normalizer network are the video signals on lines 34 and 35. The outputs of the normalizer network 57 on lines 55 and 56 in addition to an orthogonal correlation signal on line 58 selected from either line 51, 52 or 53 are applied to an automatic control system 62. Selection by the channel selector 54 of one of the orthogonal correlation signals on lines 51, 52 or 53 and one of the cross-correlation signals on lines 47, 48 and 49 is based on the amplitudes of these signals and is done to enhance the instrument's sensitivity. Again, details of the channel selection circuits are not, per se, a part of this invention but suitable circuits of this type are disclosed in U.S. application Ser. No. 708,931 of Gilbert L. Hobrough, filed Feb. 28, 1968 and assigned to the assignee of the present application, now U.S. Pat. No. 3,513,257, issued May 19, 1970. Similarly, the specific manner in which the selected cross-correction signal is separated into *x*- and *y*-cross-correction components is not, per se, a part of this invention but a suitable system for this operation is disclosed in above noted U.S. application Ser. No. 839,940. Conversely, the correlation normalizer network 57 is an important feature of the invention as described in greater detail below.

Generated in the automatic control system 62 are reference signals used to produce desired scanning patterns on the photographs 22 and 23. These reference signals are corrected, as described below, with analyzed error signals producing on lines 65–68 raster transformation signals that are applied to scanning devices (not shown) in the dual scan and transformation system 26. The reference signals are also transmitted on lines 63 and 64 to the separator network 54 and used to derive the *x*- and *y*-cross-correlation components produced on lines 61 and 59. Also provided by the automatic control system 62 on lines 73 and 74 are control signals that are applied to the servomotors (not shown) in the control servosystem 36.

Figure 2:
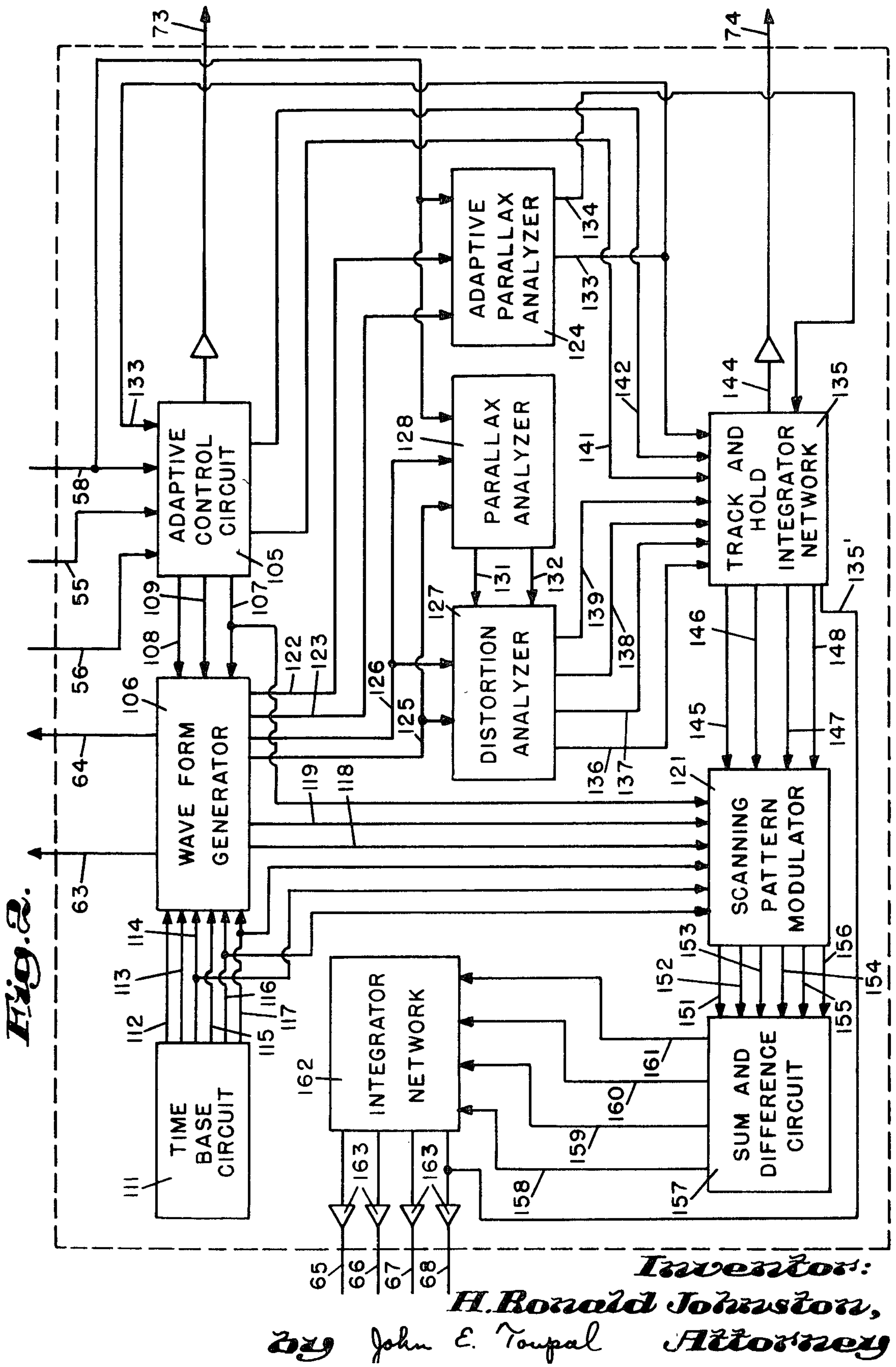
FIG. 2 is a block diagram illustrating the automatic control system shown in FIG 1.

Referring now to FIG. 2, there is shown in block diagram form the automatic control system 62 shown in FIG. 1. Receiving the normalized cross-correlation signals from the normalizer network 57 on lines 55 and 56 is an adaptive control circuit 105 that feeds control signals to a waveform generator 106 on signal lines 107, 108 and 109. Also received by the waveform generator 106 from a time base circuit 111 are reference signals on lines 112–117. Signals produced by the waveform generator 106 on output lines 118 and 119 are fed into a scanning pattern modulator 121 that also receives from the time base circuit 111 the reference signals on lines 114, 116 and 117, and from the adaptive control circuit 105 the control signal on line 107. Additional outputs of the waveform generator 106 on lines 122 and 123 are applied to an adaptive parallax analyzer 124 that also receives the selected orthogonal correlation signal on input line 58. Still other outputs of the waveform generator 106 on lines 125 and 126 are fed into both a distortion analyzer 127 and a parallax analyzer 128, the latter of which also receives the orthogonal correlation signal on input line 58.

Parallax error signals produced by the parallax analyzer 128 are transmitted into the distortion analyzer 127 on lines 131 and 132. Similar parallax error signals are produced by the adaptive parallax analyzer 124 on lines 133 and 134. The $x$-parallax signal on line 133 is fed back into the adaptive control circuit 105 and also into a track and hold integrator network 135. The $y$-parallax error signal on line 134 is controlled in track and hold integrator network 135 producing an output signal on line 135'. Received by the track and hold integrator network 135 on lines 136–139 are first order distortion error signals from the distortion analyzer 127. Also received by the track and hold integrator 135 on lines 141 and 142 are control signals from the adaptive control circuit 105 that produces on line 73 a profile velocity control voltage for the servosystem 36 shown in FIG. 1. An $x$-parallax error voltage output of the track and hold integrator 135 on line 74 is used as an $x$-parallax control voltage in the servosystem 36 shown in FIG. 1. The signals from track and hold integrator 135 on lines 145–148 are applied to the scanning pattern modulator 121 that produces output signals on lines 151–156. These signals are algebraically summed in a sum and difference circuit 157 to provide raster control signals on lines 158–161 that are integrated in the integrator network 162. Outputs of the integrator network 162 are amplified by amplifiers 163 producing deflection coil input signals on lines 65, 66, 67 and 68.

The amplitude of the $y$-gain control signal on line 108 is determined in the adaptive control circuit 105 by the value of the normalized $y$-cross-correlation signal on line 56. Ultimately, this $y$-gain control signal appears in the $y$-parallax error signal on line 135' thereby affecting the gain of $y$-parallax corrections made in the transformation system 26 (FIG. 1). Thus, the gain of the $y$-parallax correction system is responsive to the normalized $y$-cross-correlation signal on line 56. Similarly, the amplitude of the $x$-gain control signal on line 109 is determined in the adaptive control circuit 105 by the value of the normalized $x$-cross-correlation signal on line 55. This $x$-gain control signal ultimately appears in the $x$-parallax correction signal on line 74 thereby affecting the gain of the $x$-parallax corrections made by the parallax correction servosystem 36 (FIG. 1). Thus, the gain of the $x$-parallax correction system is responsive to the normalized $x$-cross-correlation signal on line 55.

The amplitude of the raster size control signal on line 107 is determined in the adaptive control circuit 105 in dependence upon the values of the $x$-parallax error signal on input line 133, the orthogonal correlation signal on input line 58 and the normalized $x$-cross-correlation signal on input line 55. This raster size control signal is combined with raster reference signals in the waveform generator 106 so as to control the sizes of the scanning patterns produced on the photographs 22 and 23 by the scan and transformation system 26 (FIG. 1). Thus, the sizes of the scanning patterns used also are dependent upon the value of the normalized $x$-cross-correlation signal. In a similar manner the value of the velocity control signal on line 73 is determined in the adaptive control circuit 105 in dependence upon the values of the $x$-parallax error signal on input line 133, the orthogonal correlation signal on input line 58 and the normalized $x$-cross-correlation signal on input line 55. Since the model profiling velocity produced by the profile control servosystem (FIG. 1) is determined by this velocity control signal, the profiling speed also is responsive to the normalized $x$-cross-correlation signal on line 55.

The presence or absence of $x$- and $y$-hold signals on lines 142 and 141, respectively, is determined in the adaptive control circuit 105 by the values of the normalized $x$- and $y$-cross-correlation signals on lines 55 and 56 with respect to given thresholds. These hold signals are effective in the track and hold integrator network 135 to prevent changes in the output signals on lines 135' and 145–148 in response to the absence of certain levels of correlation quality as indicated by the values of the normalized $x$- and $y$-cross-correlation signals. Thus, both $x$- and $y$-direction scanning pattern transformations in response to changes in the value of the orthogonal correlation signal on line 58 are prevented in the absence of given minimum levels of correlation quality as indicated by the values of the normalized $x$- and $y$-cross-correlation signals on lines 55 and 56.

Specific circuit details and operation of the various components in the automatic control system 62 do not, per se, comprise a part of this invention. Therefore, these components will not be further described. Again however, circuits suitable for performing the indicated control functions are shown and described in the above noted U.S. Pat. application Ser. No. 839,940.

Figure 3:
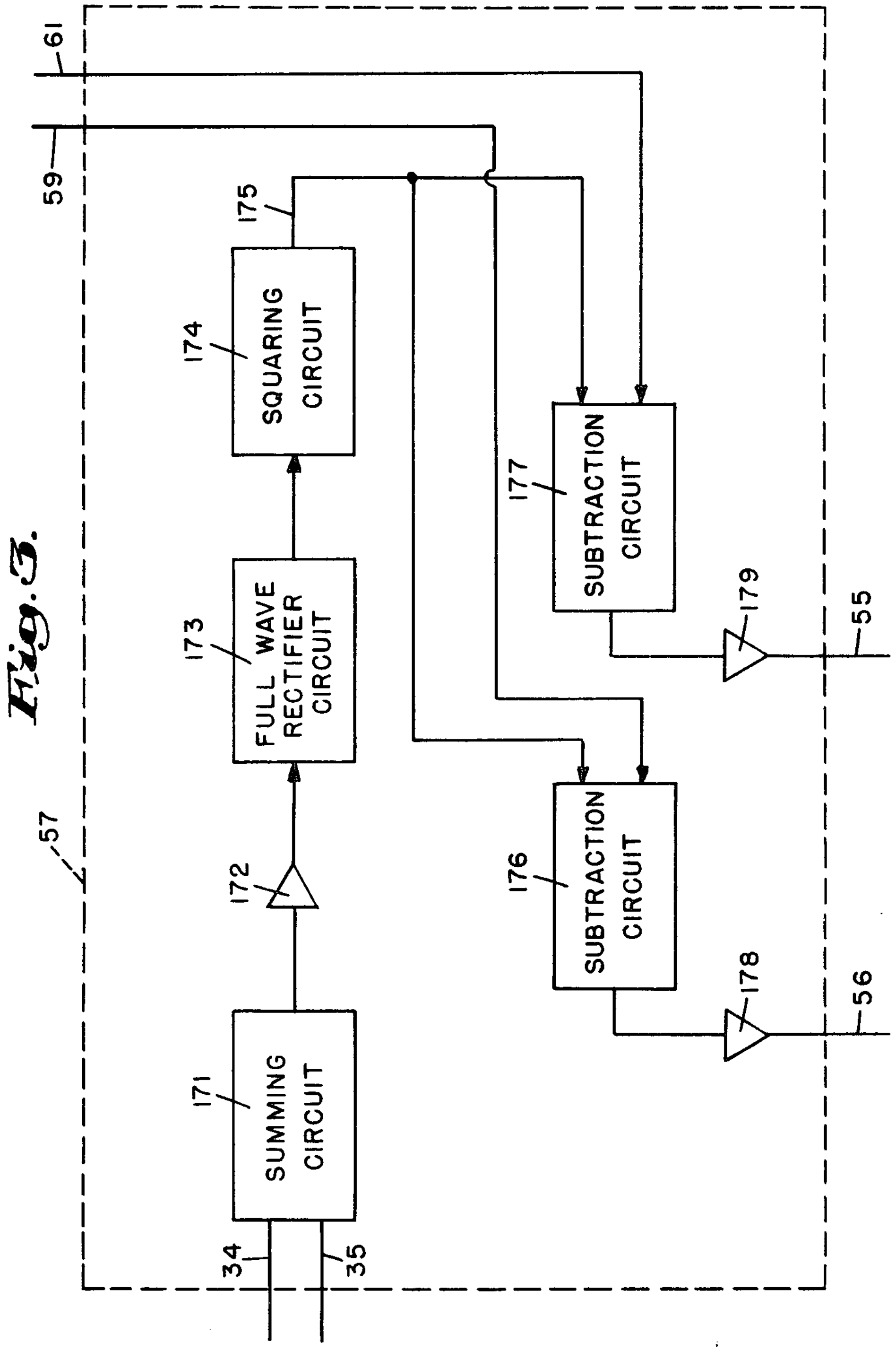
FIG. 3 is a block diagram illustrating the normalizing network shown in FIG. 1.

Referring now to FIG. 3 there is shown a block diagram of the correlation normalizer circuit 57 shown in FIG. 1. The video analog signals on lines 34 and 35 are combined in a summing circuit 171, the summation output of which is amplified in an inverting amplifier 172, rectified in a full-wave rectifier 173 and squared in a squaring circuit 174 producing a normalizing signal output on line 175. This normalizing signal is subtracted from the $x$-cross-correlation component on line 61 in a subtraction circuit 177 and from the $y$-cross-correlation component on line 59 in a subtraction circuit 176. The difference output of the subtraction circuits 176 and 177, respectively, are amplified in inverting amplifiers 178 and 179 producing a normalized $y$-cross-correlation signal on line 56 and a normalized $x$-cross-correlation signal on line 55.

The amplitudes of the video signals on line 34 and line 35 are proportional to the instantaneous levels of beam modulating image detail in the transparencies 22 and 23 as detected by photodetectors in the video signal generator 31. These levels are determined by both the density and contrast between image detail retained by the transparencies. Thus the normalizing signal on line 175 has an instantaneous amplitude responsive to the total level of detectable image detail being scanned in the transparencies 22 and 23. Conversely, the cross-correlation signal components on lines 59 and 61 have amplitudes responsive to the instantaneous level of image detail registration existing in the scanned paths in addition to the absolute level of detectable image detail along the scanned paths. Consequently, subtraction of the normalizing signal on line 175 from the cross-correlation signals on lines 59 and 61 in the subtraction circuits 176 and 177 eliminates from the cross-correlation signals the signal portion dependent upon absolute detectable image detail level. The remaining portions of the signals have amplitudes responsive only to the level of image detail registration existing along the scanned paths. Since the degree of image detail registration is more pertinent to system operation then the absolute level of detectable image detail, it will be obvious that the normalized $x$- and $y$-cross-correlation signals on lines 55 and 56 provide more accurate control of the above-described system parameters than would the $x$- and $y$-cross-correlation signals on lines 61 and 59. Control accuracy and pertinence is further enhanced, as disclosed in above noted U.S. application Ser. No. 839,940, and by the separation of the cross-correlation signal into $x$- and $y$-cross-correlation components uniquely representing, respectively, information obtained in each of orthogonally related $x$- and $y$-scanning directions.

Obviously, many modifications and variations of the present invention are possible in light of the above teachings. It is to be understood, therefore, that the invention can be practiced otherwise than as specifically described.

What is claimed is:

1. A multiple-image registration system comprising scanning means for simultaneously directing scanning patterns onto corresponding areas of a pair of similar images; signal-generating means for producing a first analog signal representing variable detail along the path scanned in one of said images, and a second analog signal representing variable detail along the path scanned in the other of said images; correlating means for deriving from said first and second analog signals an orthogonal correlation signal having an amplitude proportional to the degree of image detail misregistration along said scanned paths, and a cross-correlation signal having an amplitude proportional to the level of correlatable image detail along at least a portion of said scanned paths; and normalizing circuit means for combining said first and second analog signals to produce a normalizing signal having an amplitude which is related to the total level of detectable image detail along said scanned paths as indicated by the signal levels of said first and second analog signals; said normalizing circuit further including means for combining said cross-correlation signal and said normalizing signal to produce a normalized cross-correlation signal having an amplitude related to the difference between the signal levels of said cross-correlation signal and said normalizing signal.

2. A multiple-image registration system according to claim 1 wherein said normalizing circuit means produces said normalizing signal by combining and rectifying said first and second analog signals.

3. A multiple-image registration system according to claim 1 including control circuit means adapted to vary the size of said scanned areas responsive to said normalized cross-correlation signal.

4. A multiple-image registration system according to claim 1 including traversing means adapted to simultaneously produce a given magnitude of relative velocity between both of said images and the scanning patterns directed thereon; and a control circuit means adapted to vary said given magnitude of relative velocity in response to the value of said normalized cross-correlation signal.

5. A multiple-image registration system according to claim 1 including transformation means responsive to said orthogonal correlation signal and adapted to produce relative transformations of the areas scanned in said images, and control circuit means comprising holding circuit means adapted to render said transformation means nonresponsive to said orthogonal correlation signal in response to a predetermined condition indicated by the value of said normalized cross-correlation signal.

6. A multiple-image registration system according to claim 1 including actuation means comprising $x$-parallax correction means responsive to said orthogonal correlation signal and adapted to produce relative rectilinear movement between the areas scanned in said images, and control circuit means comprising holding circuit means adapted to render said $x$-parallax correction means nonresponsive to said orthogonal signal in response to a predetermined condition indicated by the value of said normalized cross-correlation signal.

7. A multiple-image registration system according to claim 6 wherein said $x$-parallax correction means comprises a closed-loop system, and said control circuit means is further adapted to vary the gain of said closed-loop system in response to said normalized cross-correlation signal.

8. A multiple-image registration system according to claim 6 wherein said control circuit means is further adapted to vary the size of said scanning patterns in response to said normalized cross-correlation signal.

9. A multiple-image registration system according to claim 8 including transversing means adapted to simultaneously produce a given magnitude of relative velocity between both said images and the scanning patterns directed thereon; and said control circuit means is further adapted to vary said given magnitude of relative velocity in response to the value of said normalized cross-correlation signal.

10. A multiple-image registration system according to claim 9 wherein said normalizing circuit means produces said normalizing signal by combining and rectifying said first and second analog signals.

11. A multiple-image registration system according to claim 1 including waveform-generating means for producing raster control signals that generate said scanning patterns with scanning lines oriented in orthogonally related $x$- and $y$-directions.

12. A multiple-image registration system according to claim 10 wherein said correlating means is adapted to derive from said cross-correlation signal an $x$-cross-correlation component only during periods of scan in said $x$-direction, and said normalized cross-correlation signal is normalized $x$-cross-correlation signal with an amplitude responsive to the difference between the signal levels of said $x$-cross-correlation component and said normalizing signal.

13. A multiple-image registration system according to claim 12 wherein said normalizing circuit means produces said normalizing signal by combining and rectifying said first and second analog signals.

14. A multiple-image registration system according to claim 12 including control circuit means adapted to vary the size of said scanned areas responsive to said normalized $x$-cross-correlation signal.

15. A multiple-image registration system according to claim 12 including traversing means adapted to simultaneously produce a given magnitude of relative velocity between both of said images and the scanning patterns directed thereon; and a control circuit means adapted to vary said given magnitude of relative velocity in response to the value of said normalized $x$-cross-correlation signal.

16. A multiple-image registration system according to claim 12 including transformation means responsive to said orthogonal correlation signal and adapted to produce relative transformations of the areas scanned in said images, and control circuit means comprising holding circuit means adapted to render said transformation means nonresponsive to said orthogonal correlation signal in response to a predetermined condition indicated by the value of said normalized $x$-cross-correlation signal.

17. A multiple-image registration system according to claim 12 including actuation means comprising $x$-parallax correction means responsive to said orthogonal correlation signal and adapted to produce relative rectilinear movement between the areas scanned in said images, and control circuit means comprising holding circuit means adapted to render said $x$-parallax correction means nonresponsive to said orthogonal signal in response to a predetermined condition indicated by the value of said normalized $x$-cross-correlation signal.

18. A multiple-image registration system according to claim 17 wherein said $x$-parallax correction means comprises a closed-loop system, and said control circuit means is further adapted to vary the gain of said closed-loop system in response to said normalized $x$-cross-correlation signal.

19. A multiple-image registration system according to claim 17 wherein said correlating means is also adapted to derive from said cross-correlation signal a $y$-cross-correlation component only during periods of scan in said $y$-direction, and said normalizing circuit means is further adapted to produce a normalized $y$-cross-correlation signal with an amplitude responsive to the difference between the signal levels of said $y$-cross-correlation component and said normalizing signal.

20. A multiple-image registration system according to claim 19 wherein said actuating means further comprises a $y$-parallax correction means responsive to said orthogonal correlation signal and adapted to produce between the areas scanned in said images a second direction of relative rectilinear movement orthogonally related to said direction of movement produced by said $x$-parallax correction means.

21. A multiple-image registration system according to claim 20 wherein said holding circuit means is further adapted to render said $y$-parallax correction means nonresponsive to said orthogonal correlation signal in response to a given condition indicated by the value of said normalized $y$-cross-correlation signal.

22. A multiple-image registration system according to claim 21 wherein said $y$-parallax correction means is a closed-loop system and said control circuit means is further adapted to vary the gain of said closed-loop $y$-parallax correction means in response to said normalized $y$-cross-correlation signal.

* * * * *